July 27, 1954    E. F. AHLSTROM    2,684,783
PELLET FEEDING STRUCTURE
Filed June 8, 1951
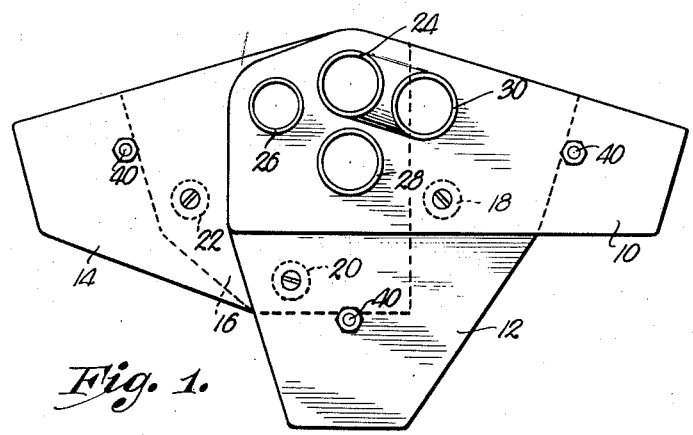
Fig. 1.
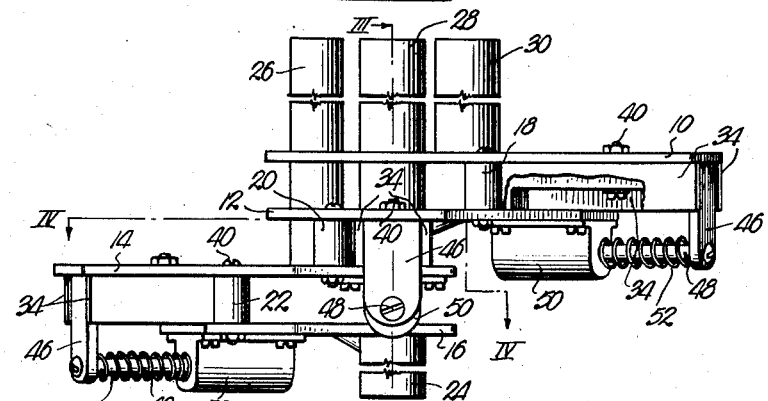
Fig. 2.
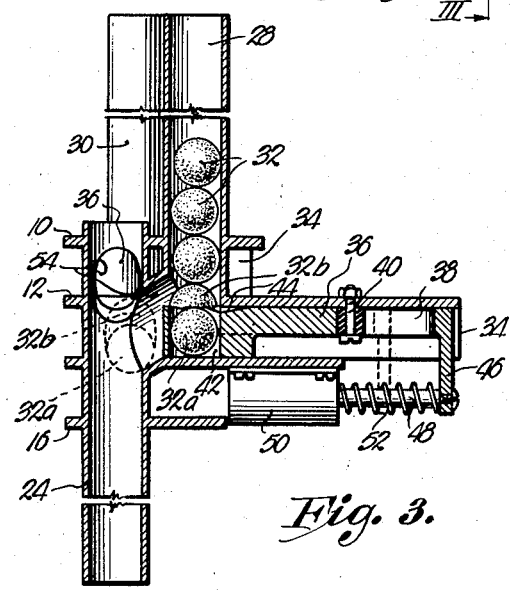
Fig. 3.
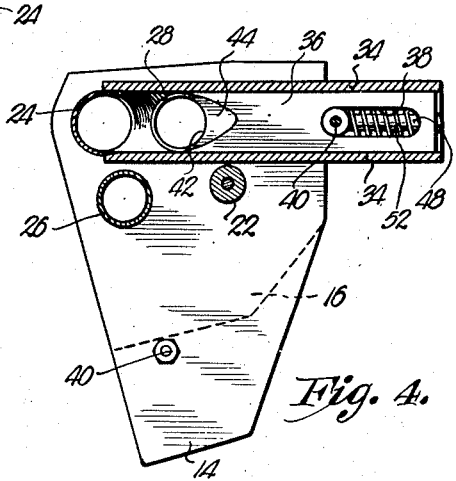
Fig. 4.
INVENTOR.
Edward F. Ahlstrom
BY
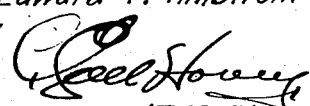
ATTORNEY.

Patented July 27, 1954

2,684,783

UNITED STATES PATENT OFFICE 2,684,783

PELLET FEEDING STRUCTURE

Edward F. Ahlstrom, Kansas City, Mo., assignor to Chef-Way, Inc., Kansas City, Mo., a corporation of Missouri Application June 8, 1951, Serial No. 230,650

4 Claims. (Cl. 221—258)

1

This invention relates to dispensing apparatus and has for its primary object the provision of structure capable of eliminating certain inherent problems experienced in conventional structures relative to breakage of the individual items being dispensed and thereby clogging or jamming the apparatus from time to time necessitating repair or servicing.

Certain articles of merchandise such as relatively fragile pellets to be dispensed by automatic vending mechanism, tend to cause difficulties in operation because of breakage of the pellets themselves and while it is desirable to dispense but a single pellet during each cycle of operation, a half pellet or other fragmentary part of a pellet, will oftentimes cause undesirable jamming.

It is accordingly the most important object of the present invention to provide a pellet dispenser that is capable of dispensing more than one full pellet but less than two pellets during each cycle of operation, there being clearance means provided for receiving up to one and one-half pellets but no more without the occurrence of jamming above referred to.

Another important object of the present invention is to provide a pellet dispensing mechanism that includes a pair of side-by-side tubes, one of which is adapted as a storage chamber for superimposed pellets, the other tube having connection with the storage tube by means of an inclined throat of such size and shape as to receive more than one pellet but less than two pellets during dispensing operations.

Another object hereof is to provide in connection with the dual tube arrangement just above set forth, a reciprocable plunger having a pellet-receiving hole therethrough for transferring the pellets from the storage tube to the discharge tube through the enlarged, interconnecting throat and so arranged as to transfer at least one full pellet during reciprocation thereof without becoming jammed or shearing the remaining pellets.

Another object hereof is to include in dispensing mechanism as above set forth, a plurality of assemblies of substantially identical character, each having a tubular storage chamber and an outlet tube that is common to the assemblies whereby a plurality of differing pellets may be dispensed simultaneously within a confined space.

Additional objects will be made clear or become apparent as the following specification progresses, reference being had to the accompanying drawing, wherein:

2

Figure 1 is a top plan view of a pellet feeding structure.

Fig. 2 is a side elevational view thereof, parts being broken away for clearness.

Fig. 3 is a vertical, cross-sectional view taken on line III—III of Fig. 2; and

Fig. 4 is a transverse, cross-sectional view taken on irregular line IV—IV of Fig. 2, and shifted 90 degrees.

A plurality of superimposed plates 10, 12, 14 and 16 are held in spaced-apart relationship by spacers 18, 20 and 22 respectively, presenting three spaces for receiving parts of the mechanisms about to be described. Such mechanisms have a common vertical outlet tube 24 that interconnects the four plates 10, 12, 14 and 16 in the manner illustrated by Fig. 3 of the drawing. Likewise, there is provided three inlet or article-storage tubes 26, 28 and 30 which may be of differing diameters if desired in the manner illustrated by Figs. 1 and 2.

The tube 26 passes through the plates 10, 12 and 14 and registers at its lowermost end with the space between plates 12 and 14 as most clearly illustrated by Fig. 3 of the drawing, and, the tube 30 passes through the plate 10 and registers at its lowermost end with the space between plates 10 and 12.

Since the assemblies for dispensing pellets 32 from the three tubes 26, 28 and 30 respectively, are identical, only one will be described. There is provided a pair of spaced-apart, parallel, horizontal guide plates 34 for receiving an elongated, L-shaped plunger 36 for reciprocation on a horizontal axis. Each plunger 36 has an elongated slot 38 therein for receiving a guide pin 40 carried by the proximal overlying plate 10, 12 or 14 as the case may be. Each plunger 36 has a pellet-receiving hole 42 formed therethrough adjacent its innermost end and a semi-oval cavity 44 in its uppermost face next adjacent the hole 42. A depending flange 46 on that end of plunger 36 opposite to hole 42 receives rod 48 forming a part of a solenoid 50 that is secured directly to the lowermost face of the plate 12—14—16 that underlies the plunger 36.

Each rod 48 has a spring 52 coiled thereabout for yieldably holding the plunger 36 in the position illustrated by Fig. 3 of the drawing and it is clear that upon energization of solenoid 50, rod 48 will be retracted against the action of spring 52 to force the plunger 36 to the dotted line position shown by Fig. 3.

It is now clear that there are three solenoids 50, three plungers 36 and the associated parts arranged in off-set relationship and at differing heights. Each tube 26—28—30 respectively, and the space within which the corresponding plungers 36 reciprocate, are connected with the vertical outlet tube 24 by an inclined throat 54 in the manner shown by Fig. 3 of the drawing. While the inside diameters of tubes 24, 26, 28 and 30 are all substantially the same as the diameter of the pellet 32 to be dispensed, the diameter of throat 54 is greater than the diameter of a single pellet 32 but less than the combined diameters of a pair of such pellets 32. It is to be preferred that throat 54 be capable of accommodating approximately one and one-half pellets but no more.

In operation therefore, when the plungers 36 are in the position shown by full lines in Fig. 3, the hole 42 is adapted to receive a single pellet 32a from the stack of pellets 32 within the corresponding tube 26, 28 or 30 because of the direct registering relationship between hole 42 and the lowermost end of the overlying inlet or storage tube. Upon energization of the corresponding solenoid 59, plunger 36 will be moved to a position registering directly with the outlet tube 24, transferring the single pellet 32a to the tube 24. If the pellet 32 next above the pellet being dispensed is of full size or greater than one-half pellet, it will strike the walls of the throat 54 and be restrained against discharge into the outlet tube 24. If, however, a broken pellet 32b that is one-half the size of pellet 32 or less, directly overlies the pellet 32a, such broken pellet 32b will be moved through the throat 54 and be discharged into the tube 24 with the pellet 32a in hole 42. If for any reason, pellets 32a and 32b do not discharge simultaneously into the outlet tube 24, then on the next operation the broken pellet 32b will be within the hole 42 and a full pellet 32 will be in overlying relationship thereto. Consequently, upon the next operation of plunger 36, the broken pellet 32b will be first discharged and the full sized pellet 32 thereabove will gravitate simultaneously in the tube 24.

As above indicated, the three discharge assemblies that include plungers 36, are at differing levels and therefore, the throats 54 are spaced along outlet tube 24 to the end that all three solenoids 50 may be energized at the same time and three differing types of pellets 32 emptied into the tube 24 at the same time.

This last mentioned feature is extremely advantageous not only from the standpoint of conserving space in the cabinet of a vending machine but has certain advantages when pellets 32 are of the type used to produce a beverage. In this respect it is contemplated that the pellets 32 be crushed and admixed with hot water or other liquid in a cup and it is for this reason that all of the pellets making up the ingredients of the drink be fed to the crusher simultaneously for admixing during the crushing action. By virtue of the provision of the semi-oval cavity 44 in the plungers 36, the pellets 32 will not be sheared or otherwise damaged during reciprocation of plungers 36.

As illustrated in Fig. 3 of the drawing, no sharp edge is presented adjacent the cavity 44 and the hole 42, so that, upon reciprocation of the plunger 36, the next pellet 32 will be received by the cavity 44 and gradually forced upwardly separating the same from the pellet 32a until it rides upon the uppermost flat face of plunger 36. Likewise, on return movement of plunger 36 to the full-line position of Fig. 3 of the drawing, the next pellet 32 to be fed to the hole 42 will gradually slide into the hole 42 until the same comes to rest on the underlying plate 12, 14 or 16 as the case may be.

While three vending assemblies have been illustrated, all having an inlet tube and all provided with a common outlet tube 24, it is obvious that a larger number of such assemblies could be provided, all in stacked relationship and offset while utilizing a single outlet tube 24 in the same manner as herein illustrated.

Figure 4 of the drawing shows the way in which the guide plates 34 presenting an elongated polygonal space therebetween, register directly with the outlet tube 24, and this figure also shows the downwardly inclined, lowermost face of the throat 54 that extends from the tube 24 to the proximal end of plunger 36 when the latter is retracted.

Having thus described the invention what is claimed as new and desired to be secured by Letters Patent is:

1. In article dispensing mechanism, a pair of side-by-side, vertical tubes; structure forming an elongated, horizontal passage extending radially outwardly from one of said tubes and communicating with the other tube at the lowermost end of the latter; structure forming a throat joining the tubes and the passage, said throat being inclined downwardly from the passage and said other tube toward said one tube; and movable means in the passage for transferring articles from the other tube through the throat to the one tube, the inside diameters of the tubes being substantially the same as the diameter of said articles, and the inside diameter of said throat being greater than the diameter of one of said articles, but less than the combined diameters of two articles.

2. In article dispensing mechanism as set forth in claim 1 wherein said means includes a reciprocable plunger having an article-receiving hole therethrough, and a semi-oval groove therein adjacent said hole, disposed to separate articles stacked in the chamber thereabove, during reciprocation of the plunger, without shearing.

3. In article dispensing mechanism, a pair of side-by-side, vertical tubes; structure forming an elongated, horizontal passage extending radially outwardly from one of said tubes and communicating with the other tube at the lowermost end of the latter; structure forming a throat joining the tubes and the passage, said throat being inclined downwardly from the passage and said other tube toward said one tube; and movable means in the passage for transferring articles from the other tube through the throat to the one tube, said means including a reciprocable plunger having an article-receiving hole therethrough and a semi-oval groove therein adjacent said hole, disposed to separate articles stacked in the chamber thereabove, during reciprocation of the plunger, without shearing.

4. In article dispensing mechanism as set forth in claim 1 wherein said means includes a reciprocable plunger having a flange depending therefrom at one end of the passage, and wherein is provided a prime mover secured to said structure and having a reciprocable rod attached to the flange for actuating the plunger.

References Cited in the file of this patent

UNITED STATES PATENTS

| Number | Name | Date |
|---|---|---|
| 1,196,105 | Groom | Aug. 29, 1916 |
| 2,399,199 | Brandon | Apr. 30, 1946 |